Feb. 12, 1924.

H. C. HAYES

METHOD OF DETERMINING DISTANCES

Filed June 25, 1919

1,483,547

INVENTOR.
Harvey C. Hayes

Patented Feb. 12, 1924.

1,483,547

UNITED STATES PATENT OFFICE.

HARVEY C. HAYES, OF NEW LONDON, CONNECTICUT, ASSIGNOR TO SUBMARINE SIGNAL COMPANY, OF PORTLAND, MAINE, A CORPORATION OF MAINE.

METHOD OF DETERMINING DISTANCES.

Application filed June 25, 1919. Serial No. 306,687½.

*To all whom it may concern:*

Be it known that I, HARVEY C. HAYES, a citizen of the United States, residing at New London, in the county of New London and State of Connecticut, have invented new and useful Improvements in Methods of Determining Distances, of which the following is a specification.

The present invention relates to a method of determining distances, and in its more specific aspects to a method of depth sounding by generating a sound at a known position and determining at another known position the angle of incidence of the sound as reflected from the bottom.

It has heretofore been suggested to make soundings by generating a sound and then listening for the echo of the sound and observing the time taken for the sound to travel vertically to the sea bottom and back vertically to the listening apparatus. Such a method involves very accurate time measurement and is not very accurate, particularly for soundings in shallow water, because of the shortness of the time to travel to the bottom and back. Moreover this method requires delicate apparatus, complicated and difficult of manipulation.

According to my method I do not depend upon time measurement but determine the depth of the water by the measurement of the angle of the reflected sound. My method depends upon the measuring of angles as contrasted to the measuring of time in the methods heretofore proposed.

In determining the depth of the water I generate a sound, as for example the noise of the ship's propeller or of a submarine bell or oscillator. At another station at a known distance from the sound source I place any suitable sound receiving apparatus which will determine the angular direction of the received sound, preferably what is known in this art as a multiunit hydrophone provided with a suitably angularly calibrated compensator. The sound from the sound source strikes the bottom of the sea and is reflected, the angle of reflection being equal to the angle of incidence according to well known laws of reflection. By knowing the horizontal distance between the sound sending and receiving stations and the angle of the reflected sound at the receiving station, I am able to calculate the vertical depth of the water. Or by knowing the depth of water and the angle of the reflected sound I am able to calculate the horizontal distance of the sound source.

Figure 1:
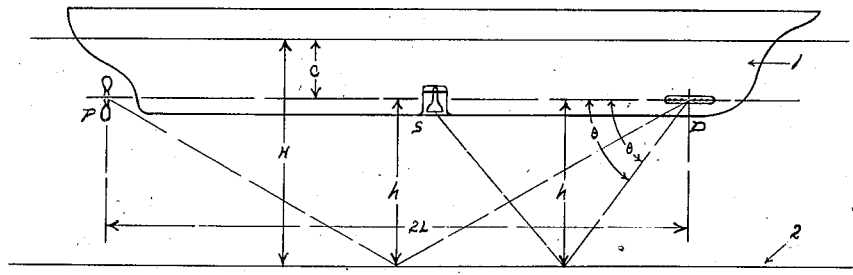
Figure 2:
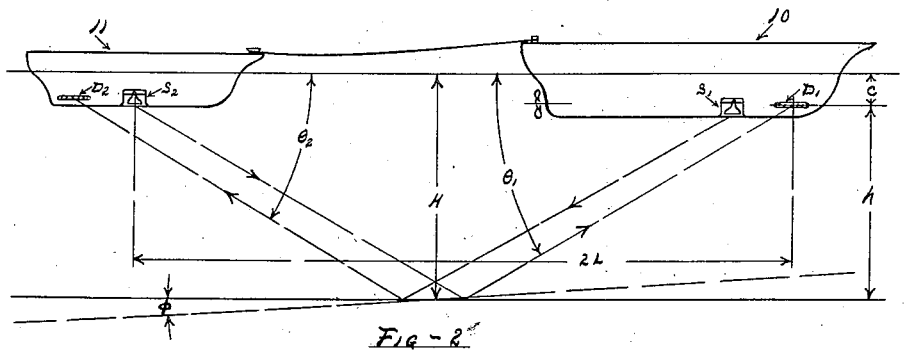
Figure 3:
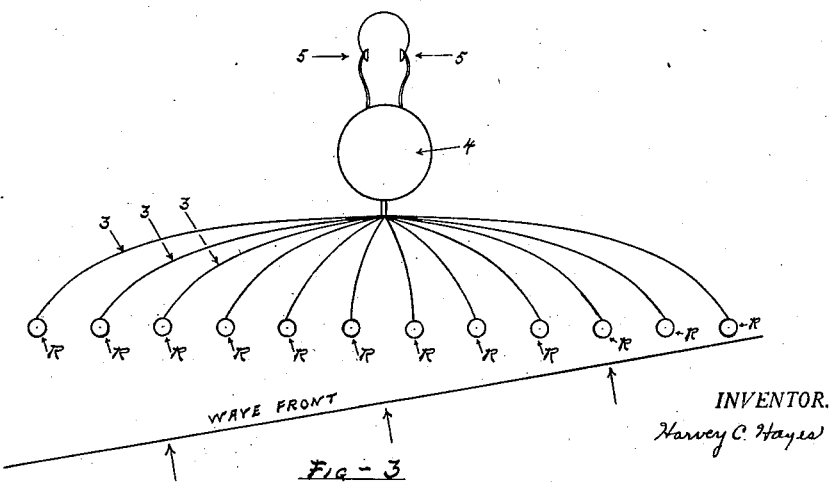

In the accompanying drawings which illustrate the preferred embodiment of my invention, Fig. 1 is a diagrammatic view showing my method of depth sounding as carried out by sound sources and receiving apparatus carried on same ship, Fig. 2 is a similar diagrammatic view showing depth sounding employing two ships, Fig. 2 also indicating the method as applied to sounding on a shelving bottom, and Fig. 3 is a diagrammatic view showing a multiunit hydrophone and compensator.

Referring first to the embodiment of the invention as illustrated in Fig. 1:—The hull of the ship from which depth soundings are to be made is indicated by reference numeral 1, and the bottom of the sea by reference numeral 2. In this figure I have indicated two possible sound sources, one the propeller of the ship P and the other a submarine bell or oscillator S. At the bow of the ship 1 mount a suitable hydrophone installation D. This may be mounted beneath a blister near the keel of the ship or may be mounted in water or oil tanks of the ship, as will be readily understood by those skilled in the hydrophone art. The hydrophone installation D preferably comprises a plurality of receivers R as indicated diagrammatically in Fig. 3. These submarine receivers may be of what is known as the acoustic type, or may be of the electrical type of receivers. These receivers are in usual practice equally spaced along a horizontal line parallel to the ship's keel. The sound pulses from the receivers are led along suitable paths 3, air columns in the case of acoustic receivers or electric wires in the case of electric receivers, to a compensator 4. The compensator 4 is provided with two ear pieces 5 by means of which the operator listens to and determines the direction of the sound. The compensator 4 is preferably constructed to employ the binaural as well as the maximum principle in determining the direction of the received sound. I have not illustrated specifically the construction of the receivers or the compensator, because such devices are well known in this art. The receiving apparatus may be what is known to the Navy Department as an MV line, disclosed for example in the co-pending application of Max Mason for the determination of wave energy direction, Serial No. 306,681½ filed June 25, 1919, or may be of the type known to the Navy Department as an electric MV line disclosed in my co-pending application for sound detection, Serial No. 306,688½ filed June 25, 1919. In case an electrical MV is used either an acoustic or electric compensator may be employed. It is necessary, however, that the receivers be so disposed and compensated that a determination of the vertical angle of sound incidence is possible. The determination of this vertical angle is possible with either the acoustic MV or electric MV lines above mentioned. The compensator 4 is angularly calibrated so that the operator may read directly from the compensator scale the angular bearing of the reflected sound, as will be readily understood by anyone familiar with hydrophone compensators.

While the receivers are illustrated as disposed in a line parallel with the ship's keel, because this is the usual positioning on vessels equipped with such receivers for detecting submarines, it is to be understood that the receivers may be otherwise disposed and at other angles to the ship's keel. For example, if an installation is made solely for depth sounding work, it may be of advantage to arrange the receivers at a different angle, say an angle of 45 degrees to the vertical, so that the sound will strike the line of receivers at substantially right angles, which angle of incidence of the sound permits a more accurate reading than for sounds approaching in a line nearly parallel to the line of receivers.

The operator listens for the sound of the propeller P or the submarine bell S as reflected from the bottom of the sea and determines the angle at which such reflected sound is received at D by the compensator reading. The depth of the water may be then readily calculated as follows: Referring to Fig. 1; let 2L represent the horizontal distance between the sound source P and the hydrophone D. Also let C represent the distance of the receivers below the surface of the water, and $h$ the distance of the receivers above the bottom. If H represents the total depth of water and $\Theta$ equals the angle which the reflected sound makes with the horizontal, then the depth of water is given by the formula:

$$H = C + L \tan \Theta$$

when the sound is reflected from a horizontal bottom. In case the water is too shallow for effectively employing the base line between sound source and receiver as long as that represented by 2L in Fig. 1, the angle of the reflected sound from an intermediate source such as represented by S may be taken and thereby improve the accuracy for sounding in shallow water.

In Fig. 2 I have illustrated my method of sounding as carried out by two vessels 10 and 11. This may be advantageously employed for sounding in deep water where a base line is required longer than that obtainable by the length of a single vessel. I have also shown in Fig. 2 the method as employed for sounding on a shelving bottom. As will be apparent, the simple formula above described is not accurate if the bottom is not substantially horizontal.

Referring to Fig. 2, suppose the bottom is shelving, as indicated by the broken line, and is inclined to a horizontal by the angle $\Phi$. If both boats are equipped with sound sources $S_1$ and $S_2$ and detectors $D_1$ and $D_2$, then as will be apparent, the angle of incidence $\Theta_1$, of the reflected sound from the source $S_2$ can be determined on the detector $D_1$, and also the angle $\Theta_2$ of the reflected sound from $S_1$ can be determined on the detector $D_2$. This gives sufficient data for accurately determining the depth H by means of the formula:

$$H = C + \frac{2L \tan \Theta_1 \tan \Theta_2}{\tan \Theta_1 + \tan \Theta_2}$$

where H is the depth of the water at the point of reflection from the bottom, and 2L is the horizontal distance between the sound source on one ship and the detecting hydrophone on the other ship. When two ships are employed the distance 2L which is the base line, may be varied in accordance with the depth of sounding. If the sound from the sound source on one vessel as transmitted directly through the water to the receiving station on the other vessel, masks or confuses the reflected sound, a suitable sound screen may be interposed before the sound source cutting off the sound as propagated horizontally while permitting the sound to be directed toward the bottom.

When two vessels are employed and the bottom is substantially horizontal, the more simple formula first given may be employed. Whether the bottom is horizontal or shelving may be readily determined by a comparison of the angles read at the two receiving hydrophones. If $\Theta_1 = \Theta_2$ then it is known that the bottom is horizontal, or by determining the difference between $\Theta_1$ and $\Theta_2$ the slope of the bottom may be determined.

It is obvious that the present method may be used for determining ranges other than vertical depth of water. For example the distance from the shore, from an iceberg, or from a reef may be determined by listening to the sound as reflected from such reflecting surfaces. The term "sounding" as here employed is therefore not intended to be limited to sound along a vertical line. The method may also be employed to determine the distance of an approaching ship in a fog, if the depth of water is known. As will be readily apparent from an inspection of Fig. 2, if the distance H is known, then the distance 2L between the ships may be readily determined.

My method of sounding has in practice been found to give accurate determinations of the depth of water, and avoids the delays of stopping or slowing down the ship and in heaving overboard the sounding lead usually employed.

While I have specifically illustrated and described the preferred embodiment of my invention, it is to be understood that my invention is not limited to its preferred embodiment, but may be otherwise embodied within the scope of the following claims:

I claim:

1. The method of sounding which consists in generating a sound and determining the angular direction of the sound reflected from the bottom, substantially as described.

2. The method of sounding which consists in generating a sound at a known source and determining at a listening station located a predetermined distance from the sound source the angle of the sound as reflected from the bottom, substantially as described.

3. The method of sounding which consists in generating a sound at a known sound source and determining at a receiving station located at a predetermined distance therefrom the angle of the sound as reflected from the bottom, generating another sound at a source near the first receiving station and determining at a listening station near the first sound source the angular direction of the sound as reflected from the bottom, whereby depth soundings may be made on a shelving bottom, substantially as described.

4. The method of determining distance which consists in generating a sound and in observing the angular direction of the sound as reflected from a surface, substantially as described.

5. The method of determining distance which which consists of generating a sound and in determining the angle of the sound as reflected from a surface, whereby the distance between the sound source and receiving station or the perpendicular distance from the reflecting surface and the line joining the source and detecting station may be determined one of which distances being known, substantially as described.

6. The method of determining submarine distances, which consists of generating a sound and in determining the angle of the sound as reflected from a submarine surface, substantially as described.

7. The method of sounding which consists in generating a submarine sound at one station on a ship and observing at another station on the ship the angle of the sound as reflected from the bottom of the sea to the second station, substantially as described.

8. The method of sounding which consists in generating a sound at a station movable with a ship and at a predetermined distance from the ship's submarine listening apparatus and observing with the ship's submarine listening apparatus the angle of the sound as reflected from the bottom of the sea, substantially as described.

9. The method of determining distance which consists in generating a sound having a maximum sound propagation in one direction and observing the angle of direction of said maximum propagation as reflected from a surface, substantially as described.

HARVEY C. HAYES.